No. 684,047. Patented Oct. 8, 1901.
R. DECKER.
ANIMAL POKE.
(Application filed Apr. 25, 1901.)
(No Model.)

Witnesses

Inventor
Ransom Decker
By
Attorneys

THE NORRIS PETERS CO., PHOTO-LITHO., WASHINGTON, D. C.

UNITED STATES PATENT OFFICE.

RANSOM DECKER, OF MEDFORD, OKLAHOMA TERRITORY.

ANIMAL-POKE.

SPECIFICATION forming part of Letters Patent No. 684,047, dated October 8, 1901.

Application filed April 25, 1901. Serial No. 57,369. (No model.)

*To all whom it may concern:*

Be it known that I, RANSOM DECKER, a citizen of the United States, residing at Medford, in the county of Grant, Oklahoma Territory, have invented certain new and useful Improvements in Animal-Pokes; and I do declare the following to be a full, clear, and exact description of the invention, such as will enable others skilled in the art to which it appertains to make and use the same.

This invention relates to improvements in animal-pokes, and has for its object to provide a device of this character which is simple of construction, cheap to manufacture, capable of being readily applied and removed, and susceptible of use without inconvenience to the animal.

The invention consists of certain novel features of construction, combination, and arrangement of parts, which will be hereinafter more fully described, and particularly pointed out in the appended claims.

Figure 1:
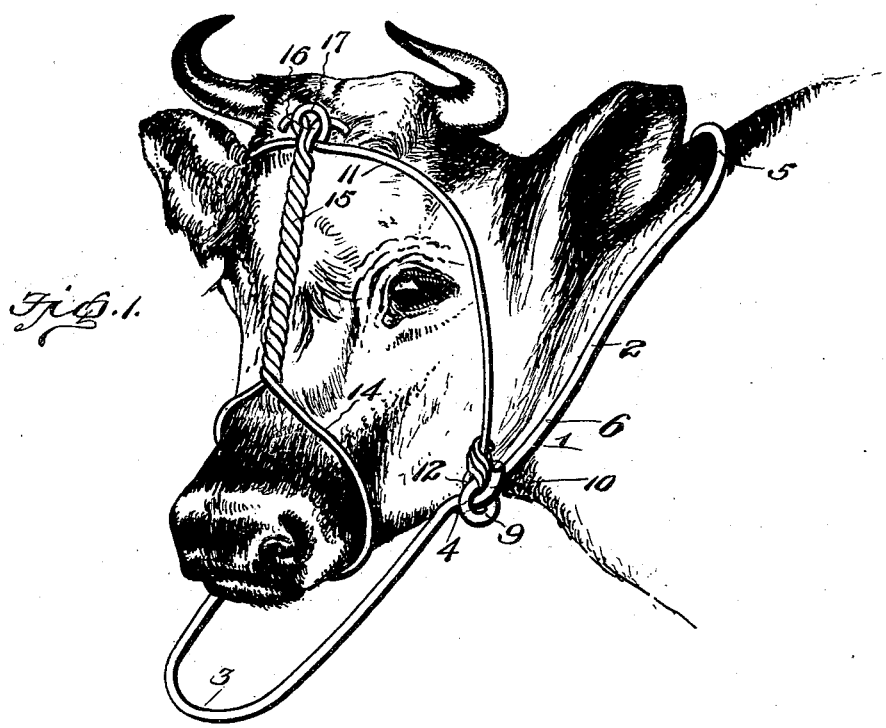
Figure 2:
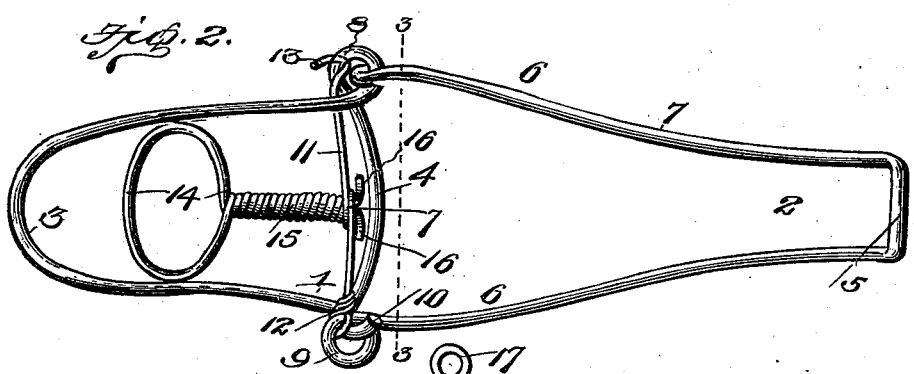
Figure 3:
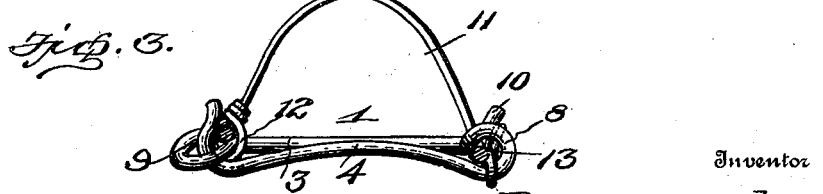

In the accompanying drawings, Figure 1 is a perspective view showing the application of the invention. Fig. 2 is a top plan view of the same; and Fig. 3 is a cross-section on line 3 3 of Fig. 2.

Referring to the drawings, 1 represents the improved animal-poke, comprising an elongated open frame formed of a single piece of stout spring-wire bent to form the yoke 2, fender-loop 3, and throat-latch 4. The yoke 2 has a curved or arched rear end or bridge-piece 5, which rests upon the neck of the animal. The arms of the yoke thence project forwardly and downwardly, so as to extend on opposite sides of the neck, and are flared at their outer ends, as shown at 6, to conform to the width of the rear end of the fender 3. The arm 7 of the yoke is formed by one end of the wire, and the throat-latch 4 is formed by the other end of the wire. An eye 8 joins the throat-latch at one end to one side of the fender 3, and an eye 9 is formed upon the opposite side of the frame to receive a hook 10 upon the free end of said latch. The eye 8 serves as a keeper to receive a hook upon the free end of the arm 7 and as a resilient coil or spring-hinge for the throat-latch 4.

The fender 3 is supported by an arched crown-piece 11, that is adapted to extend across the top of the head of the animal and consists of a piece of wire having at one end a loop 12, loosely engaging the eye 9, and at the other end a hook 13 to engage the eye 8.

In applying the device, as shown in Fig. 1, the arm 7 of the yoke 2 is unhooked from the eye 8 and forced outwardly to expand the yoke to allow it to be fitted over the neck of the animal, the throat-latch 4 being also opened to allow it to move freely below the jaw back to its proper position. The arm 7 and throat-latch are then fastened, the bridge-piece 5 rested upon the neck of the animal, and the crown-piece 11 fitted over the head in front of the horns and secured by engaging its hook 13 with the eye 8. The device is then supported upon the animal in the manner shown in Fig. 1, and the fender 3 projects forwardly to prevent the animal from crawling beneath or jumping over fences. When the device is to be used upon a muley cow, a nose-loop 14 is used in connection with the crown-piece to assist in supporting the device in position upon the animal. This nose-loop is formed of a continuous piece of wire and has a twisted stem 15, the ends of which are bent forwardly to form a hook 16, adapted to engage an eye 17 upon the center of the said crown-piece. The ends of the stem are flared, so as to spring apart by their own resiliency and prevent the hook from becoming casually disengaged from the eye. The nose-loop is applied as shown in Fig. 1, from which it will be seen that it passes around the nose and under the jaw of the animal and serves in connection with the crown-piece to hold the device securely in place.

From the foregoing description, taken in connection with the accompanying drawings, the construction and mode of operation of the invention will be readily understood, and it will be seen that a simple, cheap, and effective construction of poke is provided.

Various changes in the form, proportion, and the minor details of construction may be made within the scope of the invention without departing from the spirit or sacrificing any of the advantages thereof.

Having thus fully described my invention, what I claim as new, and desire to secure by Letters Patent, is—

1. An animal-poke consisting, essentially, of a single piece of wire bent to form an oblong open frame comprising a yoke adapted to rest upon the neck of the animal, a fender or projection, and a throat-latch, said latch being bent at one end to form an eye and provided at the other end with a hook to engage an eye upon the opposite side of the frame, one of the arms of the yoke being formed by one end of the wire and the throat-latch by the other end of the wire, said arm having at its free end a hook to engage the eye formed by said latch, and means for connecting said oblong frame to the head of an animal, substantially as described.

2. An animal-poke comprising an open oblong frame consisting of a single piece of wire bent to form a supporting-yoke, a fender and a throat-latch, the opposite sides of the frame being provided with eyes and the ends of the wire forming one arm of the yoke and the latch, which are provided at their free ends with hooks to engage said eyes, a crown-piece connected to the eyes, and a nose-loop connected to said crown-piece, substantially as described.

In testimony whereof I have hereunto set my hand in presence of two subscribing witnesses.

RANSOM DECKER.

Witnesses:
D. D. STETLER,
W. A. WILSON.